US012495234B2

(12) United States Patent
Grinker et al.

(10) Patent No.: US 12,495,234 B2
(45) Date of Patent: Dec. 9, 2025

(54) SPEAKER AND MICROPHONE FOR ACOUSTIC DEVICES

(71) Applicant: Apple Inc., Cupertino, CA (US)

(72) Inventors: Scott C. Grinker, Belmont, CA (US); Ali N. Ergun, Sunnyvale, CA (US); Anthony D. Minervini, Gilroy, CA (US); Claudio Notarangelo, San Francisco, CA (US); Matthew A. Donarski, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 248 days.

(21) Appl. No.: 18/144,789

(22) Filed: May 8, 2023

(65) Prior Publication Data

US 2023/0379609 A1 Nov. 23, 2023

Related U.S. Application Data

(60) Provisional application No. 63/345,017, filed on May 23, 2022.

(51) Int. Cl.
*H04R 1/04* (2006.01)
*H04R 1/02* (2006.01)
*H04R 1/08* (2006.01)

(52) U.S. Cl.
CPC ............... *H04R 1/04* (2013.01); *H04R 1/025* (2013.01); *H04R 1/083* (2013.01); *H04R 2400/11* (2013.01); *H04R 2499/11* (2013.01)

(58) Field of Classification Search
CPC .......... H04R 1/04; H04R 1/025; H04R 1/083; H04R 2400/11; H04R 2499/11; H04R 1/1075; H04R 1/1083; H04R 2201/003; H04R 2460/01; H04R 9/06; H04R 9/02; H04R 19/02
See application file for complete search history.

(56) References Cited

U.S. PATENT DOCUMENTS 10,015,574 B1 * 7/2018 Luce ........................ H04R 1/04
11,303,993 B2 * 4/2022 Rusconi Clerici Beltrami ........... H04R 1/1091
11,451,909 B1 9/2022 Notarangelo et al.
11,595,758 B2 2/2023 Hatipoglu et al.
2009/0245565 A1 * 10/2009 Mittleman ............ H04R 1/025 381/189
2013/0094685 A1 * 4/2013 Seo ........................ H04R 1/021 381/332
2015/0237429 A1 * 8/2015 Ryan ...................... H04R 19/04 381/174
2024/0348967 A1 * 10/2024 Wang .................. H04R 1/1016

* cited by examiner

*Primary Examiner* — Oyesola C Ojo
(74) *Attorney, Agent, or Firm* — BAKERHOSTETLER

(57) ABSTRACT

Implementations of the subject technology provide for a microphone in the front volume of a speaker. The speaker and the microphone may be provided in a single speaker assembly. The microphone may be implemented as an error microphone or a feedback microphone. The microphone may be mounted to a speaker frame of the speaker, with a sound-sensitive element of the microphone in the front volume of the speaker on a first side of the speaker frame, and with conductive contacts for the microphone disposed on an opposing second side of the speaker frame.

19 Claims, 8 Drawing Sheets

SPEAKER AND MICROPHONE FOR ACOUSTIC DEVICES

CROSS REFERENCE TO RELATED APPLICATIONS

This application claims the benefit of priority to U.S. Provisional Patent Application No. 63/345,017, entitled, "Speaker And Microphone For Acoustic Devices", filed on May 23, 2022, the disclosure of which is hereby incorporated herein in its entirety.

TECHNICAL FIELD

The present description relates generally to acoustic devices including, for example, speakers and microphones for acoustic devices.

BACKGROUND

Headphones often include speakers for generating audio output, such as for playing music or other audio content. Headphones can also include a microphone. However, it can be challenging to implement speakers and microphones in the same device including, for example in compact audio devices such as headphones.

BRIEF DESCRIPTION OF THE DRAWINGS

Certain features of the subject technology are set forth in the appended claims. However, for purpose of explanation, several aspects of the subject technology are set forth in the following figures.

DETAILED DESCRIPTION

Figure 1:
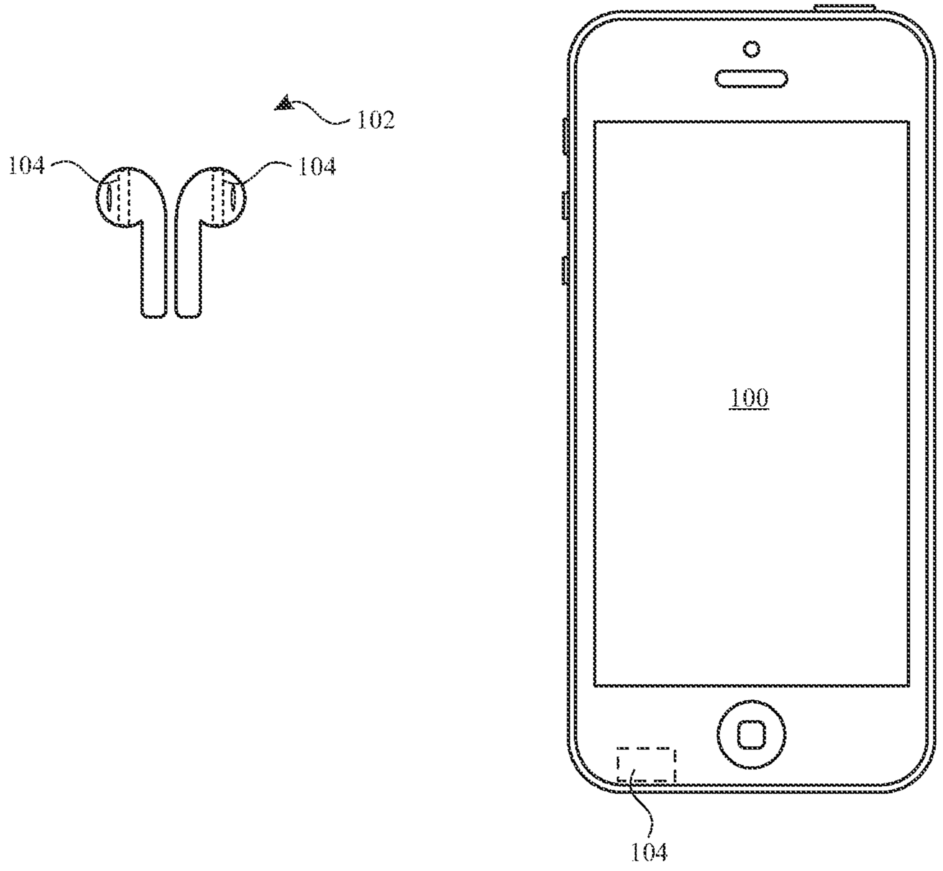
FIG. 1 illustrates example electronic devices that may include speakers and microphones in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electronic devices often include speakers that can be operated to output audio content such as music, audio tracks corresponding to video content, voices of remote users of electronic devices participating in phone calls or audio and/or video conferences, podcasts, or any other audio content. In some electronic devices, a speaker may also be operated to output an anti-noise signal in a noise-cancelling mode for the electronic device. For example, in an active noise cancellation (ANC) mode of operation, a microphone of the electronic device may obtain input audio signals that correspond to ambient noise in the environment of the electronic device, and the electronic device may generate an anti-noise signal for output by the speaker—to cancel the ambient noise at or near the location of the speaker and/or the ear of a user. ANC operations can be particularly effective, for example, when performed by electronic devices configured as audio output devices, such as headphones or earbuds that can output the anti-noise signal at the location of the user's ear and/or within the user's ear canal.

Some electronic devices, including audio output devices such as headphones or earbuds, also include an additional microphone (referred to herein as an error microphone or a feedback microphone) that can be used to sense the sound at or near the location of the user's ear and/or ear canal. This additional microphone can be used, for example, to provide real-time feedback for tuning the ANC operations, such as by sensing any residual noise that may not have been cancelled by the anti-noise signal without the feedback information. However, it can be challenging to implement a microphone in the front volume of a speaker, particularly, for example, in compact audio output devices such as earbuds.

In accordance with aspects of the subject technology, an audio output device is provided that includes a speaker having speaker assembly that includes a speaker frame and a microphone mounted to the speaker frame at least partially within a front volume of the speaker. The microphone may include or be coupled to conductive contacts on an opposing side of the speaker frame, the conductive contacts disposed in a volume of the audio output device that is fluidly sealed from the front volume of the speaker.

FIG. 1 illustrates an example of electronic devices that may implement the subject technology in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As shown in FIG. 1, an electronic device 100 may include an acoustic device such as a speaker (e.g., a speaker 104). FIG. 1 also illustrates an audio output device 102 that may include an acoustic device such as a speaker (e.g., a speaker 104). In one or more implementations, the audio output device(s) 102 may be used to output audio content received from the electronic device 100. In one or more implementations, the audio output device(s) 102 can be operated in an ANC mode or in a non-noise-cancelling mode.

The electronic device 100 may be, for example, a smartphone, a portable computing device such as a laptop computer, a peripheral device (e.g., a digital camera, headphones, another audio device, or another media output device), a tablet device, a wearable device such as a smartwatch, a smart band, and the like, any other appropriate device that includes an audio transducer and, for example, processing circuitry and/or communications circuitry for providing audio content to audio output device(s) 102. In FIG. 1, by way of example, the electronic device 100 is depicted as a mobile smartphone device with a touchscreen.

The audio output device 102 may be implemented as a smart speaker, headphones (e.g., a pair of speakers mounted in speaker housings that are coupled together by a headband and can be worn over-the-ear), or an earbud (e.g., an earbud of a pair of earbuds each having one or more speakers such as a speaker 104 disposed in a housing that conforms to a portion of the user's ear) configured to be worn by a user, for example, either on-the-ear or in-ear (also referred to as a wearer when the audio device is worn by the user), or may be implemented as any other device capable of outputting audio (e.g., and/or video and/or other types of media). In FIG. 1, byway of example, two audio output devices 102 are depicted as a pair of earbuds, each having a housing 105. Each audio output device 102 may include a speaker 104 configured to project sound into an ear of a user, and/or other components such as one or more microphones, display components for displaying video or other media to a user processing circuitry (e.g., including memory and/or one or more processors), input components such as touch sensors and/or pressure sensors, and/or communications circuitry (e.g., one or more antennas, etc.) for receiving and/or processing audio content from one or more electronic devices such as electronic device 100.

In one or more implementations, the electronic device 100 and/or the audio output device 102 may be, and/or may include all or part of, electronic system discussed below with respect to FIG. 12.

Figure 2:
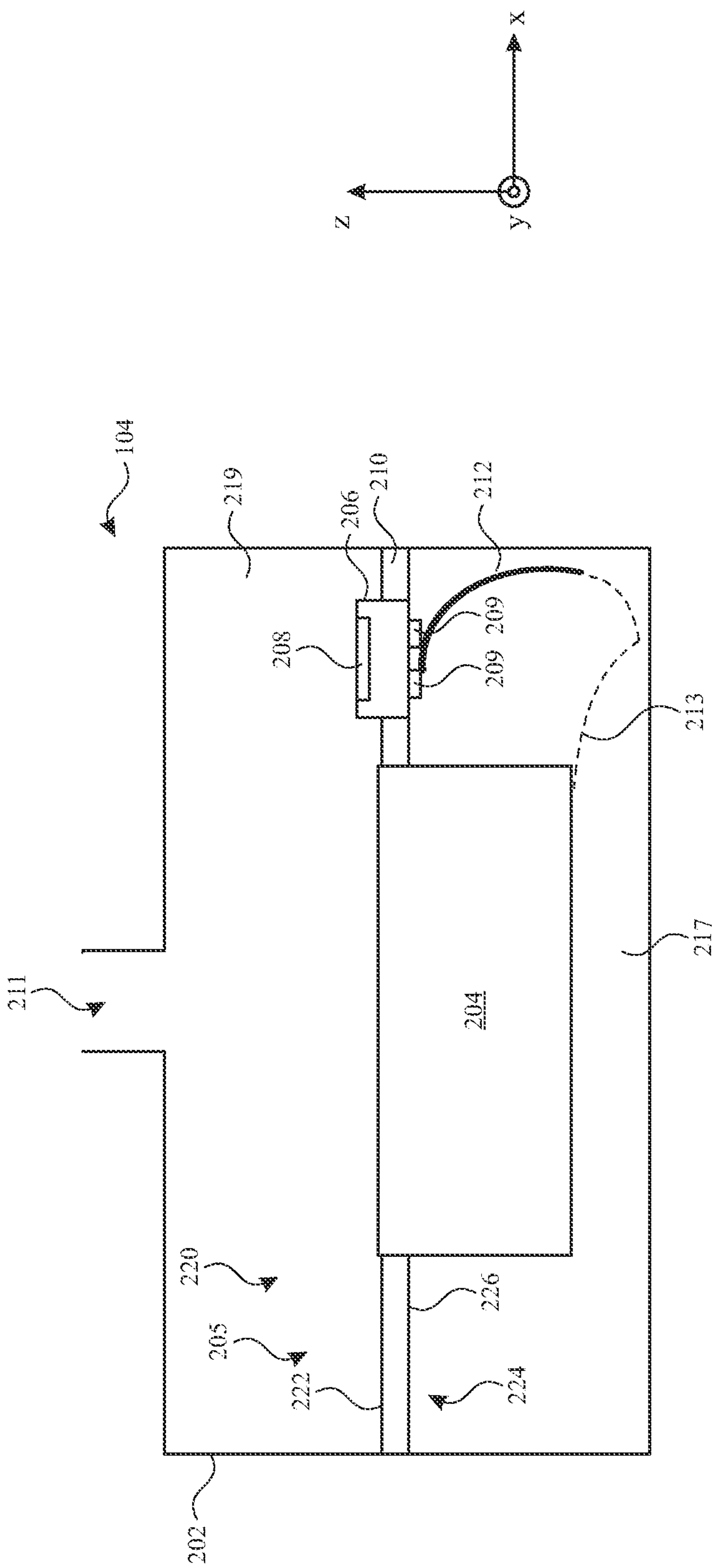
FIG. 2 illustrates a schematic cross-sectional side view of an example speaker having a microphone in accordance with various aspects of the subject technology.

FIG. 2 illustrates a schematic cross-sectional view of the speaker 104, in accordance with one or more implementations. In the example of FIG. 2, the speaker 104 includes a speaker housing 202. In one or more implementations, the speaker housing 202 maybe a portion of a housing of an electronic device within which the speaker 104 is implemented (e.g., a portion oft. For example, the speaker housing 202 may be formed by a portion of the housing 105 of the audio output device 102 of FIG. 1 in one or more implementations. In one or more other implementations, the speaker housing 202 may be a housing of a speaker module that is separate from, and disposed within, a housing of an electronic device. For example, for a speaker 104 that is implemented in the electronic device 100 of FIG. 1, the speaker housing 202 may be a speaker module housing that is disposed within the housing of the electronic device 100.

As shown in FIG. 2, the speaker 104 may include a speaker assembly 205 disposed within the speaker housing 202. As shown, the speaker assembly 205 may include a speaker frame 210, speaker components 204, and a microphone 206. As shown in the example of FIG. 2, the microphone 206 may be mounted to the speaker frame 210, so as to form a part of the speaker assembly 205. In this way, for example, assembly of the speaker 104 and/or a device in which the speaker 104 is implemented may be simplified by providing a speaker assembly that includes a built-in error microphone, and both the speaker and the error microphone can be installed in an electronic device (e.g., in the speaker housing 202) in a single operation.

In the example of FIG. 2, the microphone 206 includes a sound-sensitive element 208 (e.g., a microphone diaphragm or moveable microelectromechanical systems (MEMS) structure) that is disposed within a front volume 219 of the speaker 104. As shown, the front volume 219 may be defined, in part, by the speaker housing 202, and, in part, by the speaker frame 210 and the speaker components 204 (e.g., a speaker diaphragm of the speaker). For example, the front volume 219 may be formed on a first side 220 of the speaker frame 210 (e.g., and partially defined by a first surface 222 on the first side 220 of the speaker frame). As discussed in further detail hereinafter, the speaker components 204 may include a diaphragm, a surround that attaches the diaphragm to the speaker frame, and drive circuitry for the speaker, such as a voice coil, a magnet, one or more conductive leads for the voice coil and/or other circuitry components for the speaker 104.

As shown in FIG. 2, the microphone 206 may be mounted to the speaker frame 210 such that the sound-sensitive element 208 of the microphone 206 is disposed within the front volume 219 of the speaker 104. In this way, sound that propagates through an output port 211 of the speaker into the front volume 219 may be received at the sound-sensitive element 208 of the microphone 206. In this way, if the output port 211 of the speaker 104 is at or near the location of an ear of user of an electronic device in which the microphone 206 is implemented, the microphone 206 can be used to sense the sound that is present at or within the ear canal of the user of the electronic device. In one or more implementations, the output port 211 may be an output port of the audio output device 102.

In one or more implementations, the microphone 206 may be implemented as a microelectromechanical systems (MEMS) microphone, in which the sound-sensitive element 208 is formed by a movable portion of a MEMS structure. The MEMS microphone may generate an electrical signal when sound causes the movable portion to move (e.g., relative to a stationary plate that forms a capacitor with the movable portion). The MEMS microphone may include conductive structures that route the electrical signals (e.g., generated by changes in capacitance due to the movement of the movable portion of the MEMS structure relative to the stationary plate) to one or more conductive contacts 209. The MEMS microphone may provide raw electrical signals to the conductive contacts 209, or the MEMS microphone may include processing circuitry such as an application-specific integrated circuit (ASIC) that generates digital microphone signals for output via the conductive contacts 209.

As shown, the microphone 206 may be mounted to the speaker frame 210 such that the conductive contacts 209 for the microphone 206 are disposed within a second volume 217 on a second side 224 of the speaker frame 210 (e.g., a second volume that partially defined by a second surface 226 on the second side 224 of the speaker frame 210. In one or more implementations (e.g., implementations in which the speaker housing 202 is formed by a portion of a device housing, such as housing 105 of the audio output device 102), the second volume 217 may be a back volume of the speaker 104, or may be an interior volume of the device separate from the speaker 104, and a back volume of the speaker 104 may be formed within and defined by the speaker components 204.

As shown in FIG. 2, a flexible printed circuit 212 may be conductively coupled to the conductive contacts 209. The flexible printed circuit 212 may be used to route microphone signals from the conductive contacts 209 of the microphone 206 to processing circuitry of the speaker 104 and/or of an electronic device (e.g., electronic device 100 or audio output device 102) in which the speaker 104 is disposed (e.g., to be used as feedback information for an ANC operation). As shown, the flexible printed circuit 212 may include branch 213 that couples to the speaker components 204, so that the speaker 104 and the microphone 206 can be controlled and/or read out via the same flex in one or more implementations.

In the example of FIG. 2, the microphone 206 is mounted in the speaker frame 210 such that the sound-sensitive element 208 is disposed in the front volume 219 of the speaker on the first side 220 of the speaker frame 210, and the conductive contacts 209 are disposed in the second volume 217 on the (opposing) second side 224 of the speaker frame 210. In one or more implementations, the front volume 219 and second volume 217 may be at least partially defined by a housing of the audio output device (e.g., in an implementation in which the speaker housing 202 is formed by a portion of the housing of the audio output device 102). In one or more implementations, the audio output device 102 and/or the audio output device 102 may include the flexible printed circuit 212/213 within the second volume 217 on the second side 224 of the speaker frame 210 and coupled to the conductive contacts 209 for the microphone and to drive circuitry (e.g., included in speaker components 204) of the speaker 104.

FIGS. 3 and 4, 5 and 6, and 7 and 8 illustrate various examples of how a microphone 206 can be mounted in the speaker frame 210 such that the sound-sensitive element 208 is disposed in the front volume 219 of the speaker on the first side 220 of the speaker frame 210, and the conductive contacts 209 are disposed in the second volume 217 on the (opposing) second side 224 of the speaker frame 210.

Figure 3:
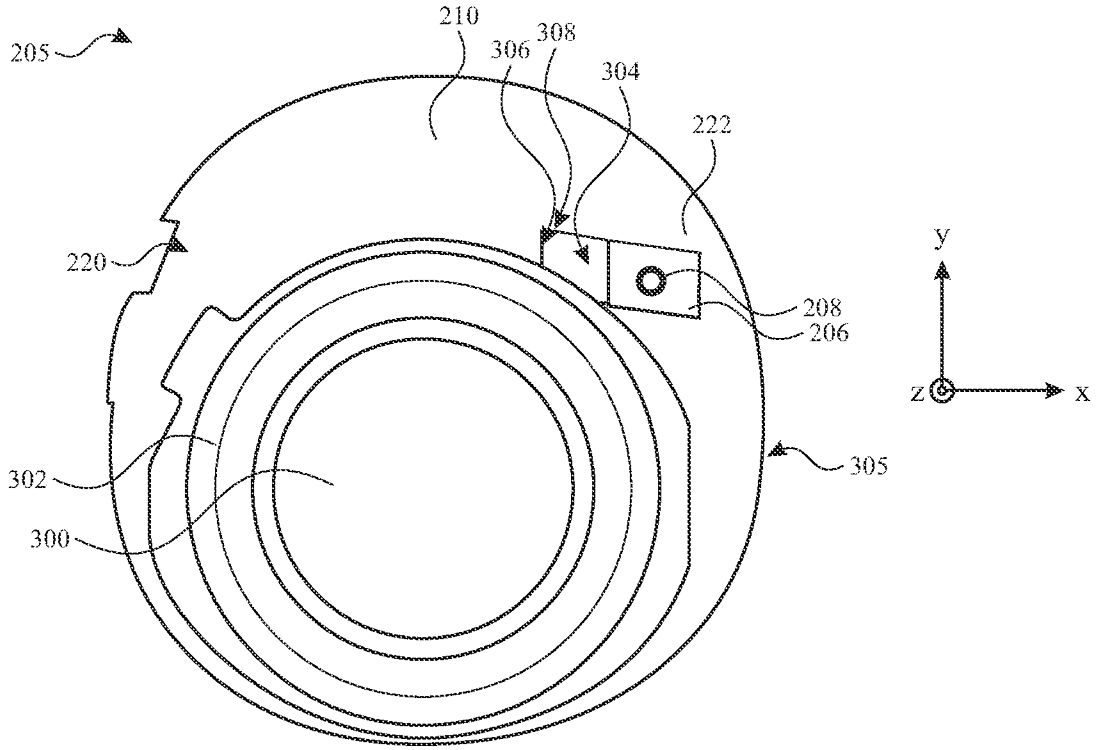
FIG. 3 illustrates a schematic top view of an example speaker assembly of the speaker of FIG. 2 in accordance with implementations of the subject technology.

For example, FIG. 3 illustrates a top view of the speaker assembly 205 of the speaker 104, in an illustrative implementation. In the example of FIG. 3, the speaker assembly 205 includes the speaker frame 210 and a diaphragm 300 mounted in the speaker frame 210. As shown, the diaphragm 300 may be movably attached to the speaker frame 210 by a surround 302. In one or more implementations, the diaphragm 300 and the surround 302 may be components of the speaker components 204 of FIG. 2. In this example, when installed in the speaker 104, the speaker frame 210 may fluidly separate at least a portion of the front volume 219 of the speaker 104 on the first side 220 of the speaker frame from the second volume 217 on the second side 224 of the speaker frame 210.

In the example of FIG. 3, the speaker assembly 205 includes a slit 306 in the speakerframe. For example, the slit 306 may extend completely through the speaker frame 210 from first side 220 to the second side 224 of the speaker frame 210 (e.g., and from the front volume 219 to the second volume 217 when the speaker assembly 205 is installed in a speaker and/or an electronic device and/or audio output device). The slit 306 may have a width that is substantially similar to the width of a flexible printed circuit 304. As shown, the microphone 206 may be mounted on (e.g., attached to, using an anisotropic conductive adhesive or other conductive adhesive) a first portion of the flexible printed circuit 304. The first portion of the flexible printed circuit 304 may be disposed within the front volume 219 and may be attached (e.g., adhesively attached or mechanically attached) to the first surface 222 on the first side of the speaker frame 210. As shown in FIG. 2, a second portion of the flexible printed circuit may passthrough the slit 306 in the speaker frame 210.

Figure 4:
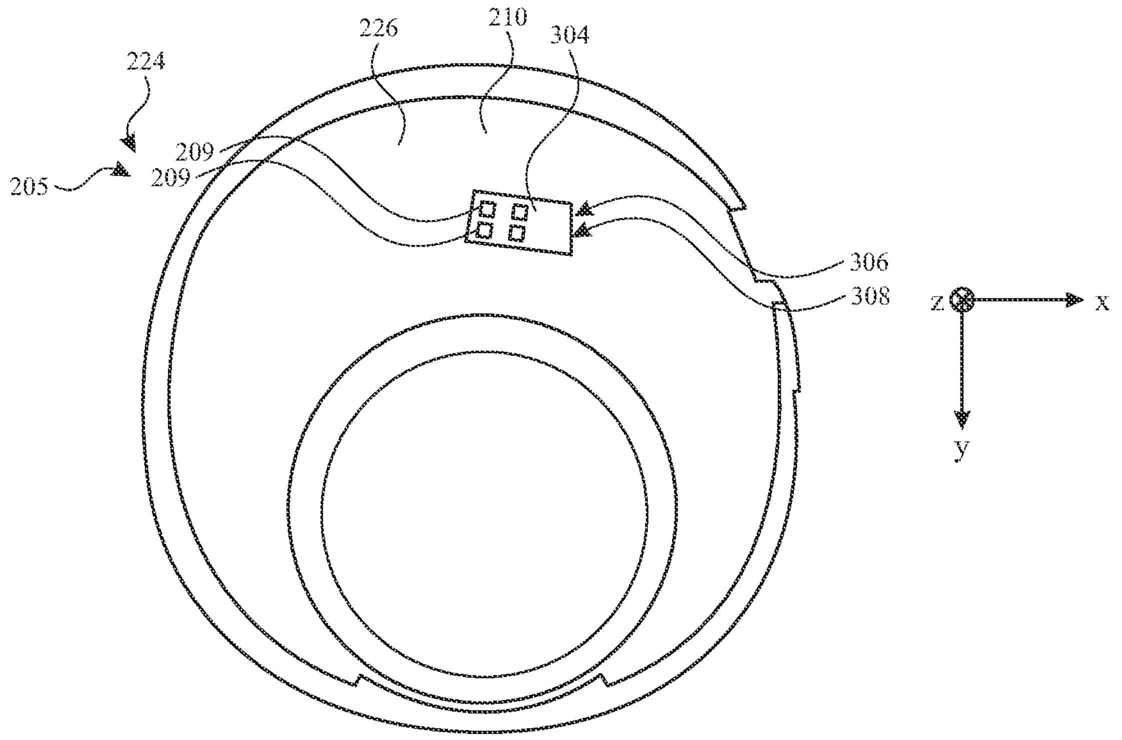
FIG. 4 illustrates a schematic bottom view of the example speaker assembly of FIG. 3 in accordance with implementations of the subject technology.

FIG. 4 illustrates a bottom view of the speaker assembly 205 of the speaker 104, in the illustrative implementation of FIG. 3. As shown in FIG. 4, a third portion of the flexible printed circuit 304 may be disposed (e.g., within the second volume 217 when the speaker assembly 205 is installed in a speaker and/or an electronic device and/or audio output device) on the second side 224 of the speaker frame 210. As shown, the conductive contacts 209 may be formed by exposed portions of the conductive structures within the flexible printed circuit 304.

In the arrangement of FIGS. 3 and 4, the slit 306 in the speaker frame 210 is located away from a peripheral edge 305 of the speaker frame 210. In this way, the flexible printed circuit 304 can pass through the slit 306 from first side 220 to the second side 224 (e.g., and from the front volume 219 to the second volume 217 when the speaker assembly 205 is installed in a speaker and/or an electronic device and/or audio output device) without extending around the peripheral edge 305, which can reduce the complexity of sealing the front volume 219 from the second volume 217 in an assembled speaker, audio output device, and/or electronic device. In one or more implementations, a sealing material 308 may be provided in a remaining portion of the slit 306 that is not filled by the second portion of the flexible printed circuit 304, to fluidly seal the slit 306 with the flexible printed circuit extending therethrough, so that, when the speaker assembly 205 is installed in a speaker, an audio output device, and/or another electronic device, the front volume 219 is fluidly sealed from the second volume 217. In one or more implementations, the flexible printed circuit 212 of FIG. 2 may be conductively coupled to the third portion of the flexible printed circuit 304. When a speaker assembly 205 in the arrangement of FIGS. 3 and 4 is installed in a speaker 104, an audio output device 102, and/or an electronic device 100, the microphone 206 may be mounted to the speaker frame 210 with the sound-sensitive element 208 disposed within the front volume 219 on the first side 220 of the speaker frame 210, and with the conductive contacts 209 for the microphone each conductively coupled to the microphone 206 and disposed within the second volume 217 on the second side 224 of the speaker frame 210.

Figure 5:
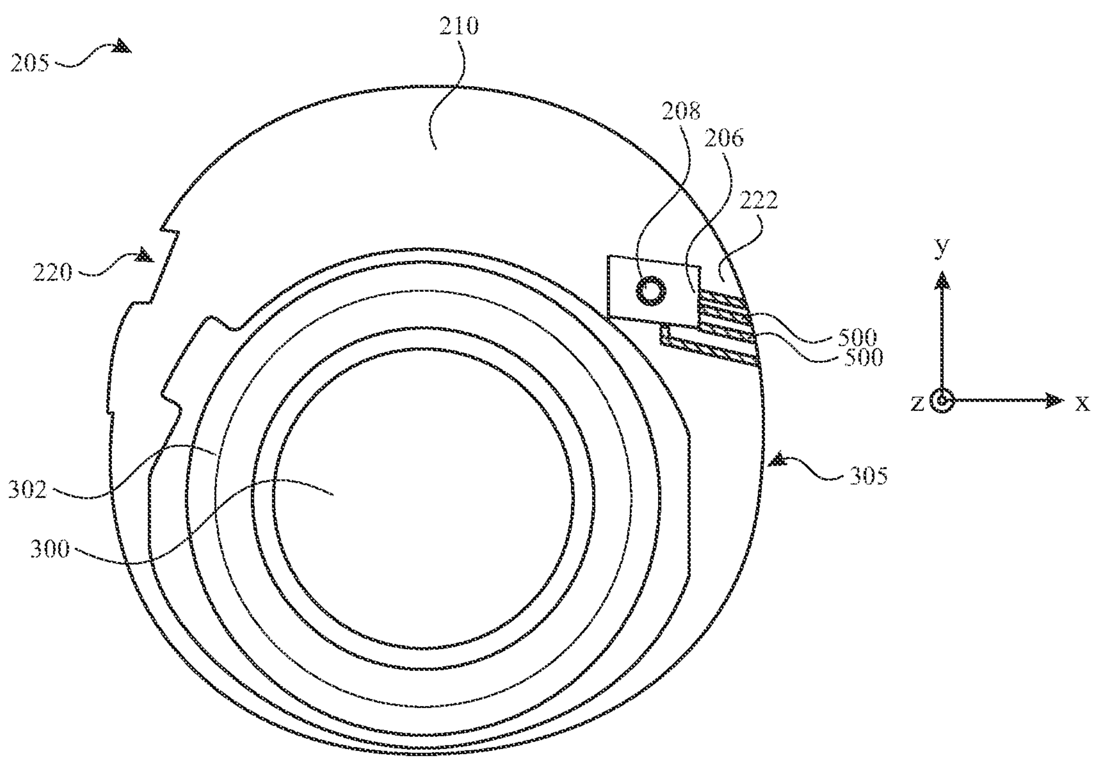
FIG. 5 illustrates a schematic top view of another example speaker assembly of the speaker of FIG. 2 in accordance with implementations of the subject technology.

FIG. 5 illustrates a top view of the speaker assembly 205 of the speaker 104, in another illustrative implementation. In the example of FIG. 5, the speaker assembly 205 includes the speaker frame 210 and the diaphragm 300 mounted in the speaker frame 210. As in the implementation of FIGS. 3 and 4, in the implementation of FIG. 5, the diaphragm 300 may be movably attached to the speaker frame 210 by a surround 302. In one or more implementations, the diaphragm 300 and the surround 302 may be components of the speaker components 204 of FIG. 2. In this example, when installed in the speaker 104, the speaker frame 210 may fluidly separate the at least a portion of the front volume 219 of the speaker 104 on the first side 220 of the speaker frame from the second volume 217 on the second side 224 of the speaker frame 210. Speaker components 204 may also separate another portion of the front volume 219 from the second volume 217.

In the example implementation of the speaker assembly 205 of FIG. 5, the microphone 206 is mounted to the first side 220 of the speaker frame 210 (e.g., attached to the first surface 222) and conductively coupled to conductive traces 500 formed in the speaker frame 210. For example, the conductive traces 500 may be laser direct structured (LDS) traces on the first surface 222 of the speaker frame 210. In this implementation, the speaker frame 210 may be formed from a thermoplastic or other polymer material or resin having an additive that can be activated by a laser. For example, a laser may be used to pattern the conductive traces 500 into the first surface 222 of the speaker frame. In one or more implementations, the conductive traces 500 are formed from the laser-activated additive in the material of the speaker frame itself, the laser-activated additive becoming conductive upon activation to form the conductive traces 500. In one or more other implementations, the laser-activated additive and/or laser-generated features of the laser-generated pattern may be coated with a conductive material that bonds to the laser-activated additive and/or laser-generated features to generate the conductive traces 500. In the implementation of FIG. 5, the conductive traces 500 may be formed and/or embedded within the first surface 222 of the speaker frame 210.

Figure 6:
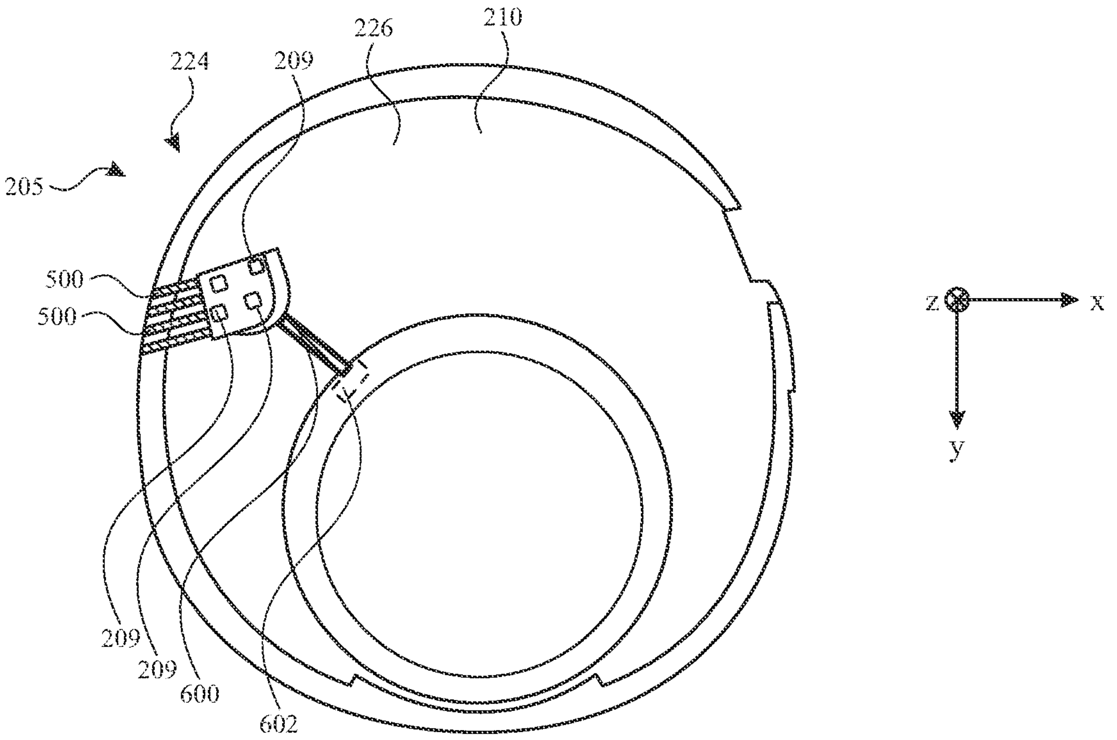
FIG. 6 illustrates a schematic bottom view of the example speaker assembly of FIG. 5 in accordance with implementations of the subject technology.

FIG. 6 illustrates a bottom view of the speaker assembly 205 of FIG. 5. As illustrated by FIGS. 5 and 6, the conductive traces 500 may extend from the microphone 206, along a portion of the first side 220 of the speaker frame 210 (e.g., on and/or within the first surface 222 on the first side 220), around an edge (e.g., the peripheral edge 305) of the speaker frame 210, and along a portion of the second side 224 (e.g., on and/or within the second surface 226 on the second side 224) of the speaker frame 210 to the conductive contacts 209 (e.g., which may be disposed within the second volume 217 when the speaker assembly 205 is installed in the speaker 104, the electronic device 100 and/or the audio output device 102). In this way, the conductive traces 500 can be arranged to route microphone signals from the microphone 206 disposed in the front volume 219, around the edge of the speaker frame 210 to the second volume 217, without being raised above the surface of the speaker frame, thereby reducing the complexity of sealing the front volume 219 from the second volume 217.

As illustrated in FIG. 6, the conductive traces 500 may extend along the second surface 226 into conductive contact with the conductive contacts 209. In this example, the conductive contacts 209 may be implemented as pins that extend from the second surface 226 of the speaker frame 210. For example, the conductive contacts 209 may be implemented as pins molded into the speaker frame 210 on the second side 224 (e.g., molded into and extending from the second surface 226). In one or more implementations, the flexible printed circuit 212 of FIG. 2 may be conductively coupled to the pins that form the conductive contacts 209. When a speaker assembly 205 in the arrangement of FIGS. Sand 6 is installed in a speaker 104, an audio output device 102, and/or an electronic device 100, the microphone 206 may be mounted to the speaker frame 210 with the sound-sensitive element 208 disposed within the front volume 219 on the first side 220 of the speaker frame 210, and the conductive contacts 209 for the microphone each conductively coupled to the microphone 206 (e.g., via the conductive traces 500) and disposed within the second volume 217 on the second side 224 of the speaker frame 210.

As illustrated in FIG. 6, in one or more implementations, the speaker assembly 205 may include one or more additional conductive traces, such as conductive trace 600. In this example, the conductive trace 600 is disposed on and/or within the second surface 226 of the speaker frame 210 and runs along the second side 224 of the speaker frame 210 between drive circuitry 602 for the speaker 104 and one of the pins that form the conductive contacts 209. Because the speaker frame 210 is formed, in the example of FIGS. 5 and 6, from an LDS material, one or more conductive traces, such as the conductive trace(s) 600 for the speaker 104 may also be formed on and/or within the second surface 226 of the speaker frame 210 via laser direct structuring. In this way, when the flexible printed circuit 212 of FIG. 2 is conductively coupled to the pins that form the conductive contacts 209, the flexible printed circuit 212 may be used to route control signals and/or readout signals between both the microphone 206 and the drive circuitry 602 to processing circuitry of an audio output device and/or another electronic device. In one or more implementations, the drive circuitry 602 may include one or more conductive leads for a voice coil, the voice coil, and/or an ASIC for operating the speaker 104 (e.g., for driving the motion of the diaphragm 300).

Figure 7:
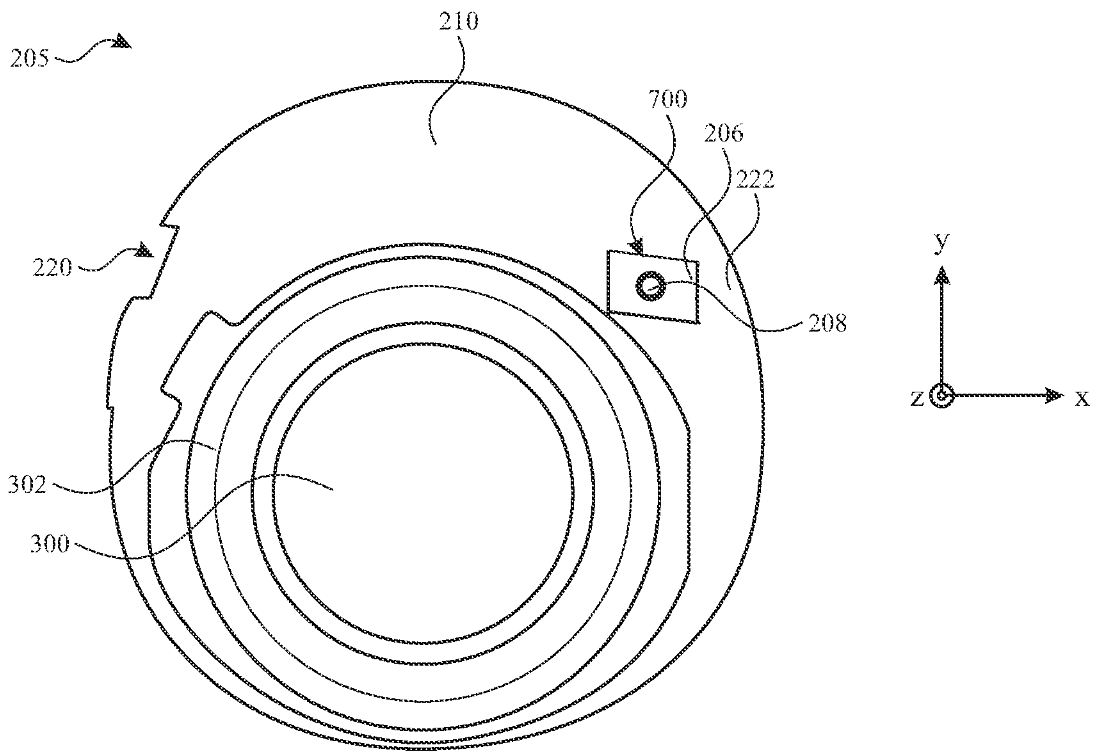
FIG. 7 illustrates a schematic top view of an yet another example speaker assembly of the speaker of FIG. 2 in accordance with implementations of the subject technology.
Figure 8:
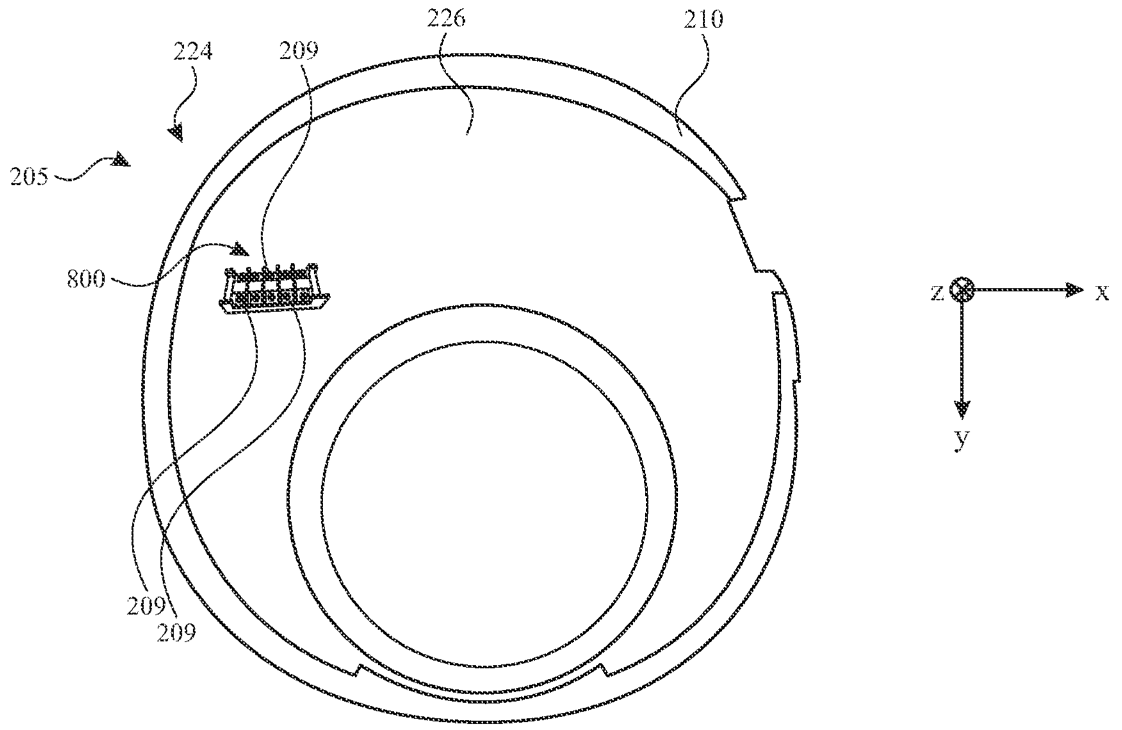
FIG. 8 illustrates a schematic bottom view of the example speaker assembly of FIG. 7 in accordance with implementations of the subject technology.

FIG. 7 illustrates a top view of the speaker assembly 205 of the speaker 104, in another illustrative implementation. FIG. 8 illustrates a bottom view of the speaker assembly 205 in the implementation of FIG. 7. In the example of FIGS. 7 and 8, the microphone 206 is disposed within the speaker frame 210 such that the microphone 206 itself extends through the speaker frame 210 from the first side 220 to the second side 224.

For example, the microphone 206 may include the sound-sensitive element 208 on the first side 220 (e.g., and within the front volume 219 when the speaker assembly 205 is implemented in the speaker 104, the electronic device 100, and/or the audio output device 102), and include a connector 800 (e.g., a board-to-board connector) at least partially disposed on the second side 224 of the speaker frame 210. In this example, the conductive contacts 209 are conductive contacts of the connector 800. In one or more implementations, the microphone 206 in the example of FIGS. 7 and 8 may be insert molded into the speaker frame 210. In one or more other implementations, the speaker frame 210 may be formed with an opening 700, and the microphone 206 may be sealingly mounted within the opening 700 such that airflow is prevented from passing through the opening 700 (e.g., between the front volume 219 and the second volume 217 when the speaker assembly 205 is implemented in the speaker 104, the electronic device 100, and/or the audio output device 102). In one or more implementations, an adhesive or other sealing material may be disposed around the microphone 206 to seal the opening 700.

Figure 9:
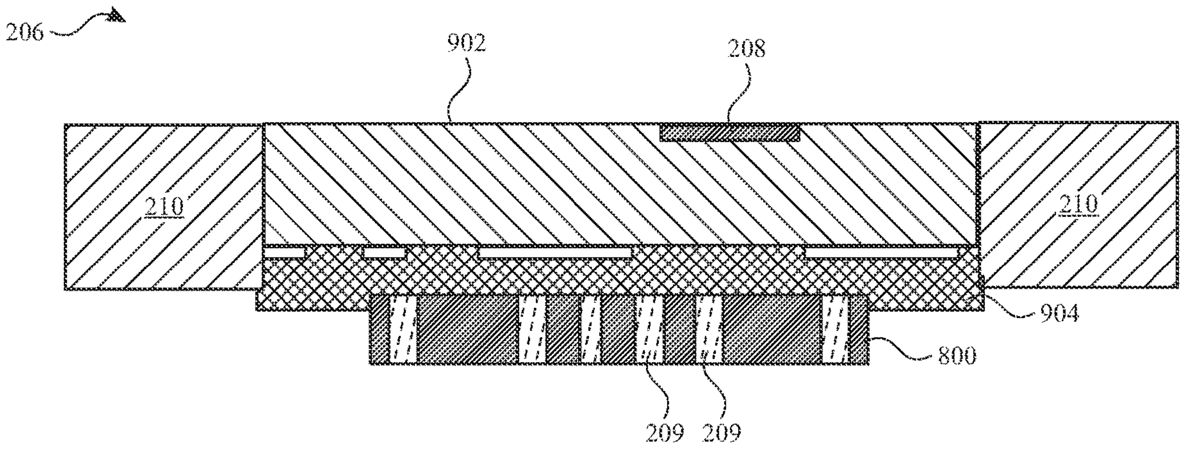
FIG. 9 illustrates a schematic cross-sectional side view of an example microphone module of the speaker assembly of FIG. 7 in accordance with implementations of the subject technology.
Figure 10:
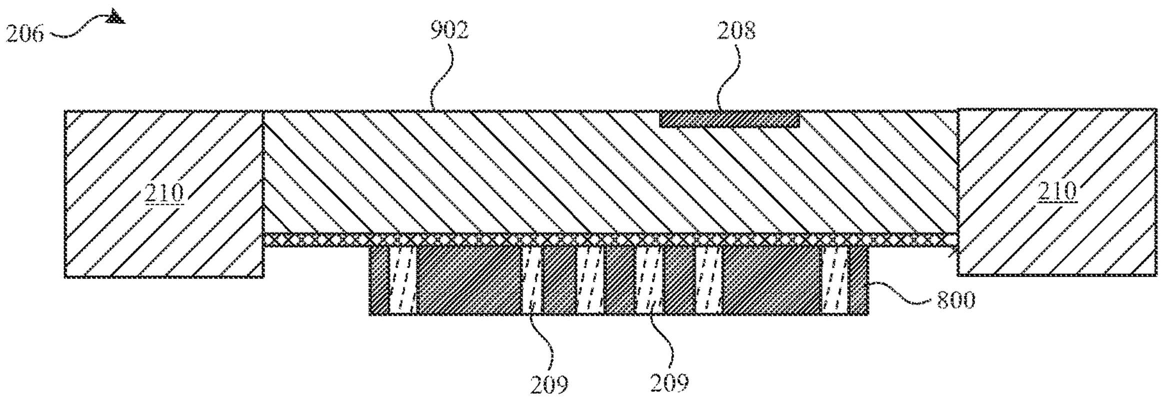
FIG. 10 illustrates a schematic side view of another example microphone module of the speaker assembly of FIG. 7 in accordance with implementations of the subject technology.

FIGS. 9 and 10 illustrate cross-sectional side views of example implementations of the microphone 206 that can be used in the implementation of the microphone 206 of FIGS. 1 and 8. In the example of FIG. 9, the microphone 206 is formed from a microphone package consisting of a microphone module 902 (e.g., a MEMS microphone module having the sound-sensitive element 208 formed in a MEMS structure), a circuit board 904 (e.g., a printed circuit board), and the connector 800 having the conductive contacts 209. In this example, the microphone module 902 is mounted on a first side of the circuit board 904, and the connector 800 is mounted on an opposing second side of the circuit board 904. In this example, conductive traces in the circuit board 904 may couple conductive elements of the microphone module 902 to the conductive structures of the connector 800.

In the example of FIG. 10, the microphone 206 is formed from a microphone package consisting of a microphone module 902 (e.g., a MEMS microphone module having the sound-sensitive element 208 formed in a MEMS structure), and the connector 800 having the conductive contacts 209. In the example of FIG. 10, the connector 800 is attached directly to the microphone module 902 (e.g., without an intervening circuit board 904). In either of the implementations of microphone package of the microphone 206 of FIG. 9 or 10, the microphone package may be insert molded into the speaker frame 210 with the microphone module disposed at least partially within the front volume 219 and the connector 800 disposed at least partially within the second volume 217 or the microphone package may be sealingly mounted within the opening 700 in the speaker frame 210 with the microphone module disposed at least partially within the front volume 219 and the connector 800 disposed at least partially within the second volume 217.

In the examples of FIGS. 2-10, the microphone 206 is mounted on a surface of the speaker frame 210 and/or within the speaker frame 210. However, in one or more other implementations, the microphone 206 may be otherwise mounted within the front volume 219 and connected to circuitry (e.g., the flexible printed circuit 212) in the second volume 217. Asone example, FIG. 11 illustrates an implementation of the microphone 206 in which the microphone 206 is suspended above the speaker frame 210 within the front volume 219.

Figure 11:
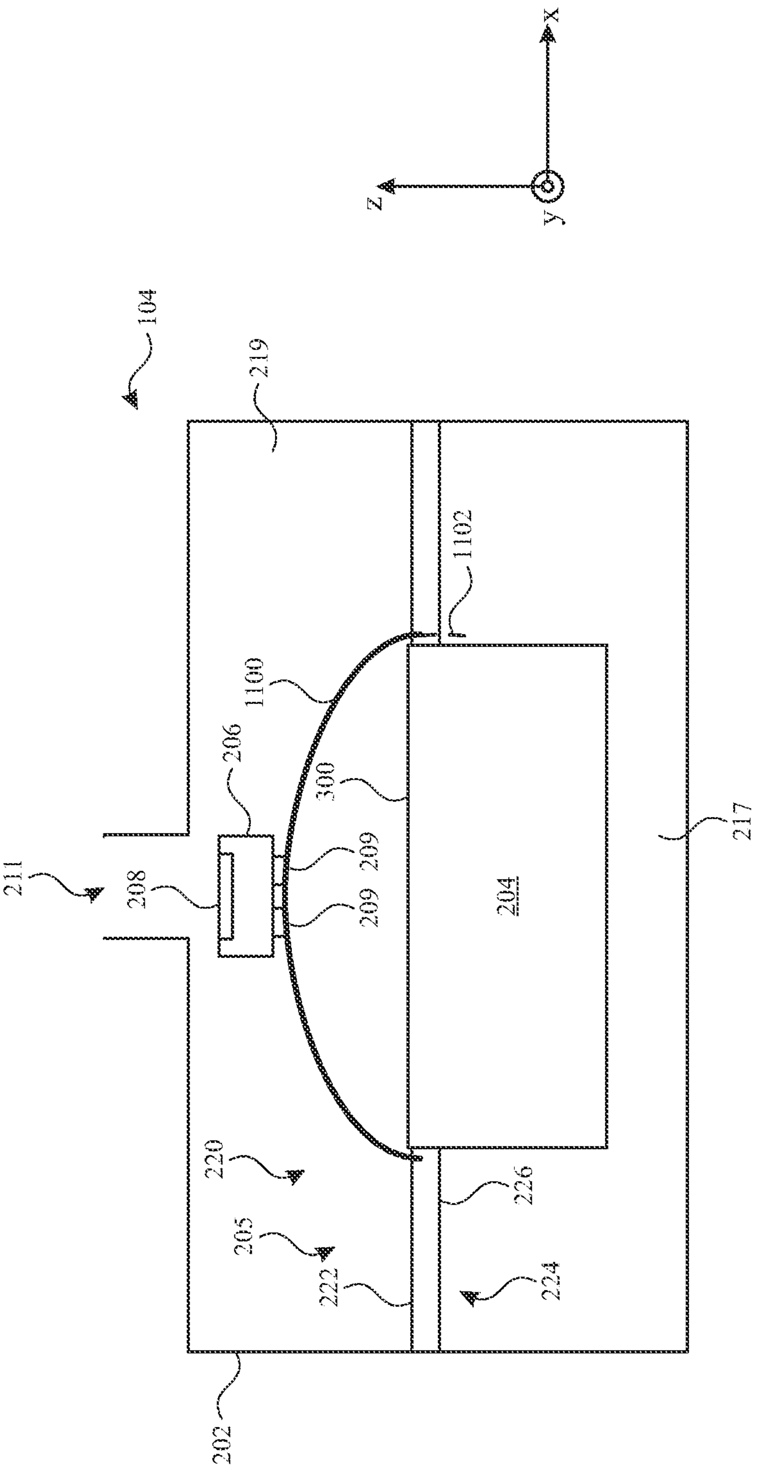
FIG. 11 illustrates a schematic cross-sectional side view of a further example speaker assembly in accordance with implementations of the subject technology.

In the example of FIG. 11, the speaker 104 includes the speaker frame 210. The speaker 104 may also include the diaphragm 300 as in FIGS. 3, 5, and/or 7 mounted in the speaker frame 210 (e.g., via the surround 302). As shown in FIG. 11, the speaker frame 210 (e.g., and the speaker components 204) may fluidly separate the front volume 219 of the speaker 104 on the first side 220 of the speaker frame 210 from the second volume 217 on the second side 224 of the speaker frame 210. In this example, the speaker 104 includes the microphone 206 within the front volume 219 on the first side 220 of the speaker frame 210 and a support structure 1100 extending from the speaker frame 210 into the front volume 219 and over at least a portion of the speaker components 204 (e.g., over at least a portion of the diaphragm 300). In this example, the microphone 206 is mounted to the support structure 1100 at a location over at least a portion of the diaphragm 300.

In the example of FIG. 11, the microphone 206 is mounted to the support structure 1100 at a location that is substantially between a center of the diaphragm and the output port 211 of the speaker 104 (e.g., which may correspond to the output port of the audio output device 102 in implementations in which the speaker housing 202 is formed by a portion of the housing 105 of the audio output device 102). In one or more other implementations, the microphone 206 maybe mounted to the support structure 1100 at one more other locations along the support structure 1100 and within the front volume 219.

In the example of FIG. 11 the support structure 1100 extends from the speaker frame 210 on a first side of the diaphragm 300 over and above the diaphragm 300 and back into contact with the speaker frame 210 on an opposing second side of the diaphragm 300. In this example, the support structure 1100 may, for example, be a relatively thin support structure that only covers a portion, such as less than ten percent, less than five percent, etc., of the diaphragm 300 (e.g., so as not to prevent sound from the speaker 104 from exiting through the output port 211. In the example of FIG. 11, two legs of the support structure 1100 can be seen extending from the speaker frame 210 over the diaphragm 300 to the microphone 206. In one or more other implementations, the support structure 1100 may include one leg that extends from the speaker frame 210 to the microphone 206 (e.g., and terminates in the air above the diaphragm 300 or the speaker frame 210), three legs that extend from the speaker frame 210 to the microphone 206, or more than three legs that extend from the speaker frame 210 to the microphone 206. In various implementations, the support structure 1100 may be formed from, as examples, metal, plastic, other materials, and or combinations thereof. In one or more implementations, the support structure 1100 may be configured to have a resonant frequency that is outside a range of frequencies of sound that are generated by the speaker 104. As shown in FIG. 11, the support structure 1100 may extend from the speaker frame at a location that is separated from (e.g., spaced apart from) the speaker housing 202 (e.g., separated from a housing of the audio output device 102, when the speaker 104 is disposed in the audio output device 102).

In one or more implementations, the speaker 104 may include at least one conductive structure 1102 coupled to the microphone 206 (e.g., coupled to the conductive contacts 209) and extending from the microphone 206, along the support structure 1100 and through (or around) a portion of the speaker frame 210 into the second volume 217 on the second side 224 of the speaker frame 210. Although not explicitly shown in FIG. 11, in one or more implementations, the flexible printed circuit 212 of FIG. 2 may also be provided within the second volume 217 on the second side 224 of the speaker frame 210 and coupled to the conductive structure 1102 (e.g., and to drive circuitry of the speaker 104 as illustrated in FIG. 2).

Figure 12:
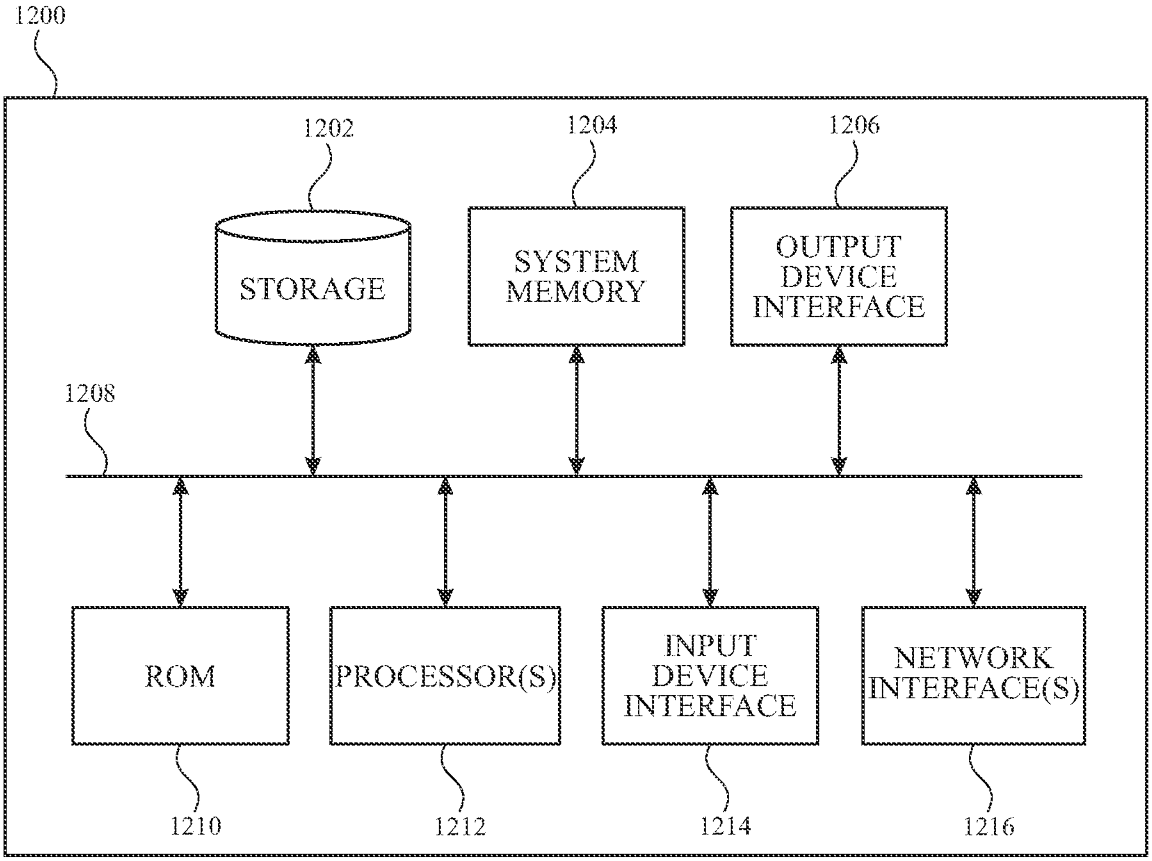
FIG. 12 illustrates an electronic system with which one or more implementations of the subject technology may be implemented.

FIG. 12 illustrates an electronic system 1200 with which one or more implementations of the subject technology may be implemented. The electronic system 1200 can be, and/or can be a part of, the audio output device 102, or the electronic device 100, as shown in FIG. 1. The electronic system 1200 may include various types of computer readable media and interfaces for various other types of computer readable media. The electronic system 1200 includes a bus 1208, one or more processing unit(s) 1212, a system memory 1204 (and/or buffer), a ROM 1210, a permanent storage device 1202, an input device interface 1214, an output device interface 1206, and one or more network interfaces 1216, or subsets and variations thereof.

The bus 1208 collectively represents all system, peripheral, and chipset buses that communicatively connect the numerous internal devices of the electronic system 1200. In one or more implementations, the bus 1208 communicatively connects the one or more processing unit(s) 1212 with the ROM 1210, the system memory 1204, and the permanent storage device 1202. From these various memory units, the one or more processing unit(s) 1212 retrieves instructions to execute and data to process in order to execute the processes of the subject disclosure. The one or more processing unit(s) 1212 can be a single processor or a multi-core processor in different implementations.

The ROM 1210 stores static data and instructions that are needed by the one or more processing unit(s) 1212 and other modules of the electronic system 1200. The permanent storage device 1202, on the other hand, may be a read-and-write memory device. The permanent storage device 1202 may be a non-volatile memory unit that stores instructions and data even when the electronic system 1200 is off In one or more implementations, a mass-storage device (such as a magnetic or optical disk and its corresponding disk drive) may be used as the permanent storage device 1202.

In one or more implementations, a removable storage device (such as a floppy disk, flash drive, and its corresponding disk drive) may be used as the permanent storage device 1202. Like the permanent storage device 1202, the system memory 1204 may be a read-and-write memory device. However, unlike the permanent storage device 1202, the system memory 1204 may be a volatile read-and-write memory, such as random access memory. The system memory 1204 may store any of the instructions and data that one or more processing unit(s) 1212 may need at runtime. In one or more implementations, the processes of the subject disclosure are stored in the system memory 1204, the permanent storage device 1202, and/or the ROM 1210 (which are each implemented as a non-transitory computer-readable medium). From these various memory units, the one or more processing unit(s) 1212 retrieves instructions to execute and data to process in order to execute the processes of one or more implementations.

The bus 1208 also connects to the input and output device interfaces 1214 and 1206. The input device interface 1214 enables a user to communicate information and select commands to the electronic system 1200. Input devices that may be used with the input device interface 1214 may include, for example, alphanumeric keyboards and pointing devices (also called "cursor control devices"). The output device interface 1206 may enable, for example, the display of images generated by electronic system 1200. Output devices that may be used with the output device interface 1206 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 12, the bus 1208 also couples the electronic system 1200 to one or more networks and/or to one or more network nodes, such as the electronic device 100 shown in FIG. 1, through the one or more network interface(s) 1216. In this manner, the electronic system 1200 can be a part of a network of computers (such as a LAN, a wide area network ("WAN"), or an Intranet, or a network of networks, such as the Internet. Any or all components of the electronic system 1200 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In one or more implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In accordance with aspects of the disclosure, a speaker is provided that includes a diaphragm having a dome portion and a neck portion that extends around a periphery of the dome portion, a coil that includes a proximal end that is at least partially attached to the neck portion of the diaphragm and a distal end that extends away from the diaphragm, in which the coil separates a first volume of the speaker that is at least partially defined by a first side of the coil and the dome portion from a second volume of the speaker that is at least partially defined by an opposing second side of the coil, and a plurality of vents that fluidly couple the first volume to the second volume.

In accordance with aspects of the disclosure, an electronic device is provided that includes a speaker, including a diaphragm having a dome portion and a neck portion that extends around a periphery of the dome portion; a coil that includes a proximal end that is at least partially attached to the neck portion of the diaphragm and a distal end that extends away from the diaphragm, where the coil separates a first volume of the speaker that is at least partially defined by a first side of the coil and the dome portion, from a second volume of the speaker that is at least partially defined by an opposing second side of the coil; and a plurality of vents that fluidly couple the first volume to the second volume.

In accordance with aspects of the disclosure, an audio transducer diaphragm is provided that includes a dome, a neck, and a plurality of radially extending protuberances angularly spaced apart around the audio transducer diaphragm.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure described herein.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

What is claimed is:

1. An audio output device, comprising:

a speaker comprising a speaker frame and a diaphragm mounted in the speaker frame, the speaker frame separating a front volume of the speaker on a first side of the speaker frame from a second volume on a second side of the speaker frame;

a microphone mounted to the speaker frame and including a sound-sensitive element disposed within the front volume on the first side of the speaker frame;

a plurality of conductive contacts for the microphone, each conductively coupled to the microphone and disposed within the second volume on the second side of the speaker frame; and at least one conductive structure that extends through or around the speaker frame from the microphone to the plurality of conductive contacts.

2. The audio output device of claim 1, further comprising:

a slit in the speaker frame; and a flexible printed circuit, wherein the microphone is mounted to a first portion of the flexible printed circuit within the front volume, a second portion of the flexible printed circuit passes through the slit in the speaker frame, and a third portion of the flexible printed circuit within the second volume on the second side of the speaker frame comprises the plurality of conductive contacts.

3. The audio output device of claim 2, wherein the slit in the speaker frame is located away from a peripheral edge of the speaker frame.

4. The audio output device of claim 1, wherein the at least one conductive structure comprises a plurality of conductive traces formed in the speaker frame, and wherein the microphone is mounted to the first side of the speaker frame and conductively coupled to the plurality of conductive traces formed in the speaker frame.

5. The audio output device of claim 4, wherein the plurality of conductive traces extend from the microphone, along a portion of the first side of the speaker frame, around an edge of the speaker frame, and along a portion of the second side of the speaker frame to the plurality of conductive contacts disposed within the second volume.

6. The audio output device of claim 5, wherein the plurality of conductive traces comprise a plurality of laser direct structured traces on a surface of the speaker frame.

7. The audio output device of claim 5, further comprising a plurality of pins molded into the speaker frame on the second side and forming the plurality of conductive contacts.

8. The audio output device of claim 7, further comprising at least one additional conductive trace that runs along the second side of the speaker frame between drive circuitry for the speaker and at least a respective one of the plurality of pins.

9. The audio output device of claim 1, wherein microphone comprises a microphone package comprising a microphone module and a connector attached to the microphone module, wherein the microphone package is insert molded into the speaker frame with the microphone module disposed at least partially within the front volume and the connector disposed at least partially within the second volume.

10. The audio output device of claim 1, wherein the speaker frame comprises an opening, wherein the microphone comprises a microphone package comprising a microphone module and a connector attached to the microphone module, and wherein the microphone package is sealingly mounted within the opening in the speaker frame with the microphone module disposed at least partially within the front volume and the connector disposed at least partially within the second volume.

11. The audio output device of claim 1, wherein the front volume and second volume are at least partially defined by a housing of the audio output device, and wherein the second volume comprises a back volume for the speaker or an internal volume of the audio output device that is separate from the back volume of the speaker.

12. The audio output device of claim 1, further comprising a flexible printed circuit within the second volume on the second side of the speaker frame and coupled to the plurality of conductive contacts for the microphone and to drive circuitry of the speaker.

13. A speaker assembly, comprising:

a speaker comprising a speaker frame and a diaphragm mounted in the speaker frame, the speaker frame arranged to separate a front volume of a speaker on a first side of the speaker frame from a second volume on a second side of the speaker frame; and a microphone mounted to the speaker frame and including a sound-sensitive element disposed within the front volume on the first side of the speaker frame;

a plurality of conductive contacts for the microphone, the conductive contacts disposed within the second volume on the second side of the speaker frame; and at least one conductive structure that extends through or around the speaker frame from the microphone to the plurality of conductive contacts.

14. The speaker assembly of claim 13, wherein the at least one conductive structure comprises a plurality of conductive traces formed in the speaker frame, and wherein the microphone is mounted to the first side of the speaker frame and conductively coupled to the plurality of conductive traces formed in the speaker frame, and wherein the plurality of conductive traces comprise a plurality of laser direct structured traces that extend from the microphone, along a portion of the first side of the speaker frame, around an edge of the speaker frame, and along a portion of the second side of the speaker frame to the plurality of conductive contacts disposed within the second volume.

15. The speaker assembly of claim 13, wherein the microphone comprises a microphone package comprising a microphone module and a connector attached to the microphone module, wherein the microphone package extends through the speaker frame with the microphone module disposed at least partially within the front volume and with the connector disposed at least partially within the second volume.

16. An audio output device, comprising:

a speaker comprising a speaker frame and a diaphragm mounted in the speaker frame, the speaker frame separating a front volume of the speaker on a first side of the speaker frame from a second volume on a second side of the speaker frame;

a microphone within the front volume on the first side of the speaker frame;

a support structure extending from the speaker frame into the front volume and over at least a portion of the diaphragm, wherein the microphone is mounted to the support structure at a location over at least a portion of the diaphragm and at least one conductive structure coupled to the microphone and extending from the microphone along the support structure and through or around a portion of the speaker frame into the second volume on the second side of the speaker frame.

17. The audio output device of claim 16, wherein the microphone is mounted to the support structure at a location that is substantially between a center of the diaphragm and an output port of the audio output device.

18. The audio output device of claim 16, wherein the support structure extends from the speaker frame at a location that is separated from a housing of the audio output device.

19. The audio output device of claim 16, further comprising a flexible printed circuit within the second volume on the second side of the speaker frame and coupled to the conductive structure and to drive circuitry of the speaker.

* * * * *